UNITED STATES PATENT OFFICE.

EDWARD WESTERMAYR, OF CHICAGO, ILLINOIS.

IMPROVED COMPOSITION FOR ARTIFICIAL STONE.

Specification forming part of Letters Patent No. 85,713, dated January 5, 1869.

*To all whom it may concern:*

Be it known that I, EDWARD WESTERMAYR, of Chicago, in the county of Cook and State of Illinois, have invented certain new and useful Improvements in Artificial Stone; and I do hereby declare that the following is a full, clear, and exact description thereof.

To enable others skilled in the art to construct and use my invention, I will proceed to describe it.

My invention consists in producing an artificial stone, of any desired form or color, by mixing and compounding certain materials and subjecting the mixture to certain novel processes, as hereinafter explained.

For the purpose of producing my artificial stone, I take one (1) part of Portland cement, one-half ($\frac{1}{2}$) part of clean sand, and one-half ($\frac{1}{2}$) part of slag, (cinder of iron,) and mix them together in a dry state. To this mixture I add water containing sulphate of iron or copperas, in solution, in sufficient quantity to make a stiff mortar by thoroughly stirring up and mixing the mass. The mortar thus made I then put into molds of any desired form, and subject it therein to pressure by any suitable means until compacted into a mass sufficiently firm, fixed, and solid to form an artificial stone. This stone I then place in a warm drying-room, and keep it there about two weeks, when I put it into a reservoir of clean water, and allow it to remain there about twenty-four hours, for the purpose of dissolving any particles of lime that may be adhering to or remaining in it, as well as for increasing its hardness.

After being removed from the water and allowed to dry, it will be found, in the course of four or five weeks, to possess all the hardness and durability of the best qualities of natural stone, and superior to it for many purposes.

Any desired color may be given to the stone by mixing any suitable pigments with the mortar, as India red, lamp-black, and other coloring materials.

In this way I am able to produce or manufacture an artificial stone of any desired form or color.

Having thus described my invention, what I claim is—

An artificial stone of any desired form or color, when made of the materials and in the manner substantially as herein described.

EDWARD WESTERMAYR.

Witnesses:
 WM. H. LOTZ,
 J. W. BUPE.